Figure 1:
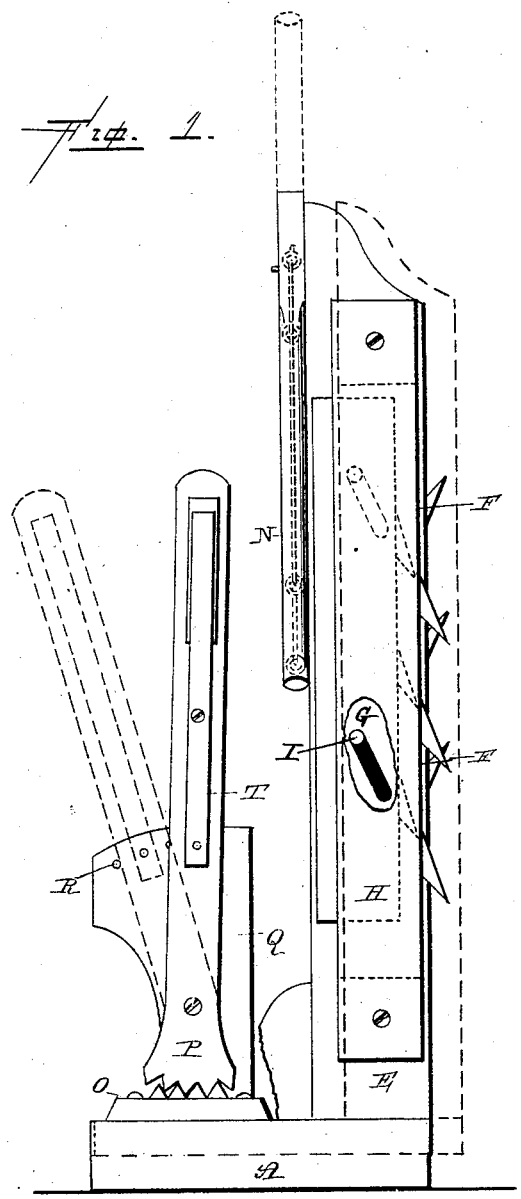

(No Model.)  2 Sheets—Sheet 1.

E. & C. M. DRAKE.
SAW MILL DOG.

No. 310,190. Patented Jan. 6, 1885.

Witnesses.
Louis F. Gardner
J. W. Garner

Inventors
E. Drake
C. M. Drake
per F. A. Lehmann
Atty.

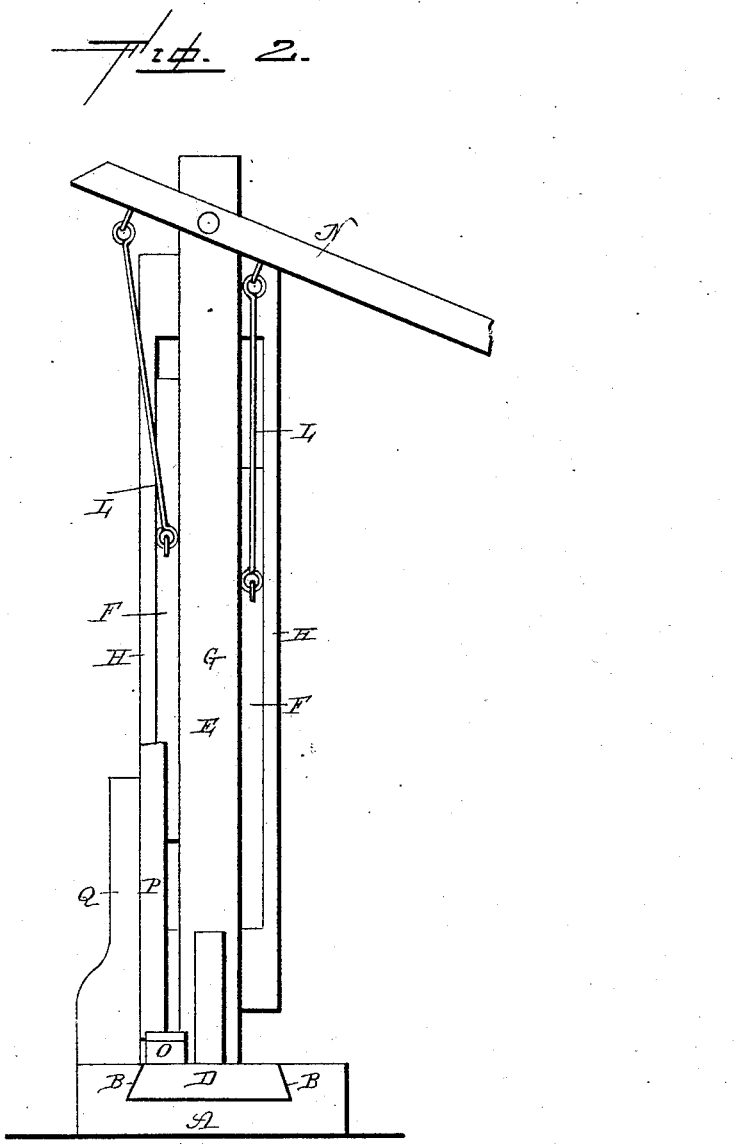

UNITED STATES PATENT OFFICE.

ELBRIDGE DRAKE AND CHARLES M. DRAKE, OF GARDINER, MAINE.

SAW-MILL DOG.

SPECIFICATION forming part of Letters Patent No. 310,190, dated January 6, 1885.

Application filed March 13, 1884. (No model.)

*To all whom it may concern:*

Be it known that we, ELBRIDGE DRAKE and CHAS. M. DRAKE, of Gardiner, in the county of Kennebec and State of Maine, have invented certain new and useful Improvements in Saw-Mill Dogs; and we do hereby declare the following to be a full, clear, and exact description of the invention, such as will enable others skilled in the art to which it pertains to make and use it, reference being had to the accompanying drawings, which form part of this specification.

Our invention relates to an improvement in saw-mill dogs; and it consists, first, in the combination of the standard, the lever, the connecting-rods, and the two dogs, which are provided with teeth which extend in opposite directions; second, in the combination of the standard, the lever, connecting-rods, and dogs provided with teeth, with a mechanism for moving the standard and all of its attachments, as will be more fully described hereinafter.

The object of our invention is to provide a saw-mill dog which is placed upon a beam upon the carriage, and which beam slides back and forth in relation to the saw, and which dog is provided with teeth which move in opposite directions, and which take a firm hold upon the log, for the purpose of holding it rigidly in position while being operated upon.

Figure 1 is a side elevation of a dog embodying our invention, the parts being shown in one position in solid lines, and in another position in dotted lines. Fig. 2 is an edge view of our invention.

A represents a suitable base, which is provided with the dovetailed guides B upon its top. This base is secured rigidly to a beam that is placed upon skids on the carriage, and these skids are secured to a beam upon the length of the carriage, and which slides back and forth in relation to the saw. When the beams move back and forth upon the carriage, the dogs are carried along with them.

So far as the construction of the beam and the skids are concerned we make no claim, as this is old.

Upon the top of the base, and moving back and forth in between the two guides B, is the sliding base D, to the front end of which is rigidly secured the standard E, in which the dogs F are placed. This standard consists of a solid central piece, G, and the side pieces or cheeks, H. In between the inner sides of the cheeks and the outer sides of the central part, G, are placed the two dogs, which are provided with teeth which project in opposite directions. These dogs are provided with projections I upon one or both of their sides, and these projections I catch in grooves or slots made in the outer side of the post G, or inner side of the cheeks, or both, as may be preferred. These slots are made to extend at an angle of sixty-eight and one-half degrees, so that the teeth will catch in the log without forcing it out of position in any direction. To the rear side of the dogs are fastened the lower ends of the connecting-rods L, which rods have their upper ends fastened upon opposite sides above the operating-lever N. This lever is pivoted near the top of the standard, and when moved in either direction it causes the dogs to move in opposite directions. When the outer end of the lever is raised upward, both dogs are drawn backward, so as to withdraw their teeth from the outer side of the standard, and when the movement of the lever is reversed the dogs are forced downward and outward, and the teeth of the dogs are made to enter the log upon the carriage, for the purpose of holding it rigidly in position.

For the purpose of adjusting the standard, together with the dogs, back and forth upon the skids, a rack-bar, O, is secured to the top of the sliding base, and with this rack-bar the lower end of the toothed lever P is made to engage. This lever P is pivoted upon the upright Q, which has a series of holes, R, formed through its upper end, and in which holes the projection upon the lower end of the spring-actuated lever T is made to catch for the purpose of locking the standard in any desired position.

By means of the toothed lever and the rack-bar the standard can be forced forward any desired distance, or drawn back out of the way, as may be required.

Having thus described our invention, we claim—

The combination of the standard, the two slotted slides which are applied to opposite sides of the standard, the side pieces which keep the dogs in position, the guiding-pins secured to the slides, and which catch in suitable slots made to receive them in the standard or side pieces, the operating-lever, and connecting-rods, whereby the dogs are made to move in opposite directions, substantially as shown.

In testimony whereof we affix our signatures in presence of two witnesses.

ELBRIDGE DRAKE.
CHARLES M. DRAKE.

Witnesses:
    JOHN M. TURNER,
    EDWIN E. WILSON.